United States Patent [19]

Takahashi

[11] Patent Number: 5,286,214
[45] Date of Patent: Feb. 15, 1994

[54] MEMORY CARD CONNECTOR

[75] Inventor: Hisafumi Takahashi, Tokyo, Japan

[73] Assignee: Kel Corporation, Tokyo, Japan

[21] Appl. No.: 996,895

[22] Filed: Dec. 28, 1992

[30] Foreign Application Priority Data

Dec. 27, 1991 [JP] Japan .................. 3-113365[U]

[51] Int. Cl.$^5$ .......................... H01R 13/633
[52] U.S. Cl. ........................... 439/159; 439/92
[58] Field of Search ................ 439/152–160, 439/372, 92

[56] References Cited

U.S. PATENT DOCUMENTS

| | | | |
|---|---|---|---|
| 4,602,835 | 7/1986 | Bauer et al. | 439/160 |
| 4,778,395 | 10/1988 | Narita | 439/159 |
| 4,893,405 | 1/1990 | Pennington | 439/160 |
| 4,914,552 | 4/1990 | Kecmer | 439/157 |
| 5,026,296 | 6/1991 | Hashiguchi | 439/159 |
| 5,110,301 | 5/1992 | Inoue et al. | 439/157 |

FOREIGN PATENT DOCUMENTS 2239991 7/1991 United Kingdom ............ 439/157

Primary Examiner—Eugene F. Desmond
Attorney, Agent, or Firm—Robert W. J. Usher

[57] ABSTRACT

A memory card connector has an ejection mechanism comprising an extraction plate which is mounted across a frame defining a card receiving compartment for reciprocal movement in the card insertion direction and has card releasing hooks for engaging the mating end of the card and a flange connecting to a driven rack of a rack and pinion mechanism a driving rack of which extends from a card release button exposed at the front of the compartment. The ejection mechanism is housed in a compartment formed in the frame laterally of the card receiving compartment and substantially coplanar therewith.

16 Claims, 5 Drawing Sheets

MEMORY CARD CONNECTOR

FIELD OF THE INVENTION

The invention relates to memory card connectors, particularly to memory card connectors for releasably connecting memory cards to computer circuit boards.

BACKGROUND OF THE INVENTION

Memory cards containing integrated circuitry, (e.g. flash memory), which are approximately the same size as credit or business cards, have recently been adopted for use as a memory medium for small computers (e.g. notebook or laptop computers, electronic notebooks). Such memory cards have a series of pin receiving sockets in a mating end which releasably mate with pin contacts anchored in circuit boards of the computer.

A prior memory card connector is described in Japanese Utility Model Bulletin No. 63-69375, published May 10, 1988, and comprises frame means providing a memory card receiving compartment having a front end formed with an elongate memory card receiving mouth, a rear end with mateable, electrical connecting means extending thereacross, and memory card guiding means extending rearwardly in a memory card insertion direction away from the mouth towards the electrical connecting means.

In using such connector, the memory card is manually inserted into the memory card receiving compartment and pushed rearwardly bringing the sockets into mating engagement with the contact pins. However, to release the memory card it is necessary to provide an ejection mechanism to overcome the pin retention force of the sockets so that, subsequently, the memory card can easily be removed by hand from the connector. Such ejection mechanism should apply an evenly distributed extraction force to the memory card to avoid skewing of the memory card during extraction and possible consequential distortion of the contacts.

In the prior document, the ejection mechanism comprises a pair of extraction parts aligned to engage the mating face on the left and right of the socket series, the extraction parts being connected to driven racks mounted in the frame for reciprocal movement in the insertion direction, a pair of pinions meshing with respective rack teeth and with driving rack teeth on respective opposite sides of an operating part extending rearwardly from a release button.

In order to extract the memory card from the connector, the release button is depressed manually, actuating the racks and pinions causing the extraction parts to push the memory card out of of mating engagement with the pin contacts.

However, in the arrangement taught by the prior document, the rack and pinion mechanism and button are located above the memory card, undesirably increasing the height (thickness) of the connector which should be minimal for many applications

SUMMARY OF THE INVENTION

An object of the invention is to provide a memory card connector of the above type having an extraction mechanism which permits the thickness dimension (height) to be acceptably small.

According to one aspect, the invention provides a memory card connector comprising frame means providing a memory card receiving compartment having a front end formed with an elongate memory card receiving mouth, a rear end with mateable, electrical connecting means extending thereacross, and memory card guiding means extending rearwardly in a memory card insertion direction away from the mouth towards the electrical connecting means; a memory card extraction plate having a planar body portion and memory card engaging hook means extending therefrom, means mounting the extraction plate on the frame for reciprocal movement in the insertion direction with the body portion extending across the compartment and with the hook means extending into the compartment, aligned for engagement with a mating end of a memory card received therein so as to apply an evenly distributed extraction force thereto; an ejection mechanism located on a lateral side of the guide frame adjacent and in substantially coplanar relation with the mouth and comprising an ejection button exposed at the front of the frame, pinion means, and driving and driven rack means operatively connected with the ejection button and the extraction plate, respectively, and meshing with the pinion means in opposite rotational senses whereby insertion of the memory card, mating end leading, through the mouth into the compartment brings the mating end, guided by the guide means, into mating engagement with the electrical connecting means to establish electrical connection therewith and depression of the ejection button actuates the driving rack to rotate the pinion means moving the driven rack and thereby the extraction plate forwards with the hook means engaging the mating end of the memory card to pull the memory card forwards out from mating engagement with the electrical connection means permitting manual withdrawal of the memory card from the compartment.

The planar body portion of the plate form extraction plate is of sufficient strength and stiffness to apply an evenly distributed extraction force to the memory card with the ejection mechanism attached to only one side thereof but sufficiently thin to avoid substantial increase in connector height.

More specifically, the hook means are aligned to engage the mating end of the memory card on respective opposite lateral sides thereof, clear of the sockets.

In a preferred embodiment, the driving and driven racks extend in spaced apart, side-by-side relation in the insertion direction meshed with respective opposite sides of the pinion means, this provides an extremely simple and inexpensive, but reliable mechanism.

The extraction plate may be operatively connected to the driven rack by a flange formed thereon being anchored in the driven rack, and, preferably, the driven rack is formed with an anchoring slot which extends in the insertion direction, the flange being anchored to the driven rack by receipt in the slot, and the anchoring slot being of greater length than the flange permitting limited sliding movement of the flange therealong in the insertion direction.

In a preferred construction, at least one resilient grounding foot is struck out of the body portion of the extraction plate for grounding engagement with a major face of a memory card received in the compartment, means being provided for connecting the body portion to a ground contact and comprising a spring contact finger which is mounted to extend forwardly on the rear end of the frame for sliding receipt of the body portion therebetween during insertion and extraction of the memory card from the compartment.

This automatically discharges static from the memory card during insertion and removal from the compartment.

In one construction, the frame means is bipartite, comprising a forward part incorporating the ejection mechanism and a rearward part incorporating the electrical connecting means complementary latching means being provided on respective frame parts interengageable with a snap action to assemble the frame parts together. A lateral side of the guide frame may be formed with a compartment housing the ejection mechanism increasing the compactness of the connector and excluding dust.

BRIEF INTRODUCTION TO THE DRAWINGS

Specific embodiments of the invention will now be described by way of example only and with reference to the accompanying drawings in which.

DESCRIPTION OF PREFERRED EMBODIMENT

Figure 1:
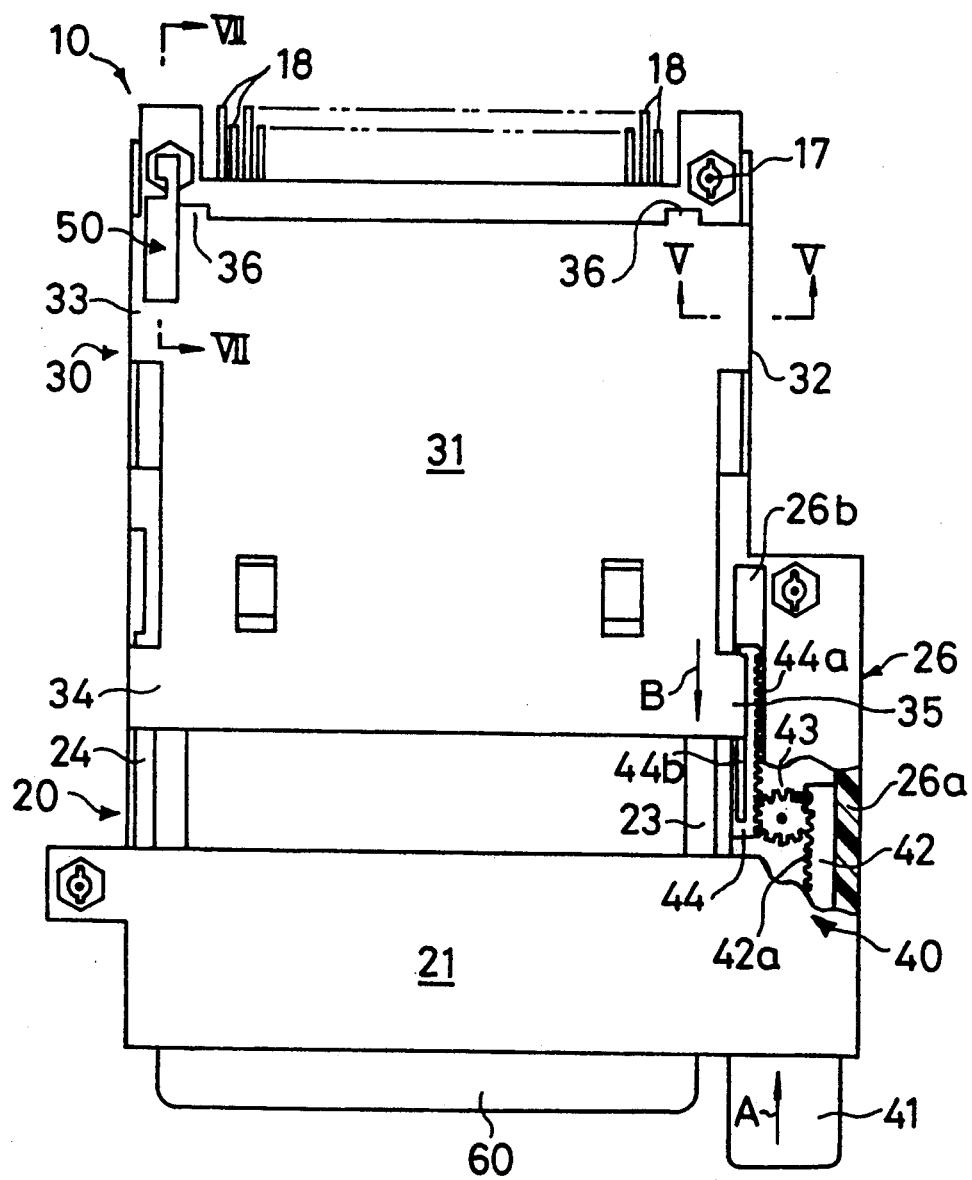
FIG. 1 is a plan view, partly broken away, of a memory card connector according to the invention, with a memory card fully inserted therein.
Figure 2:
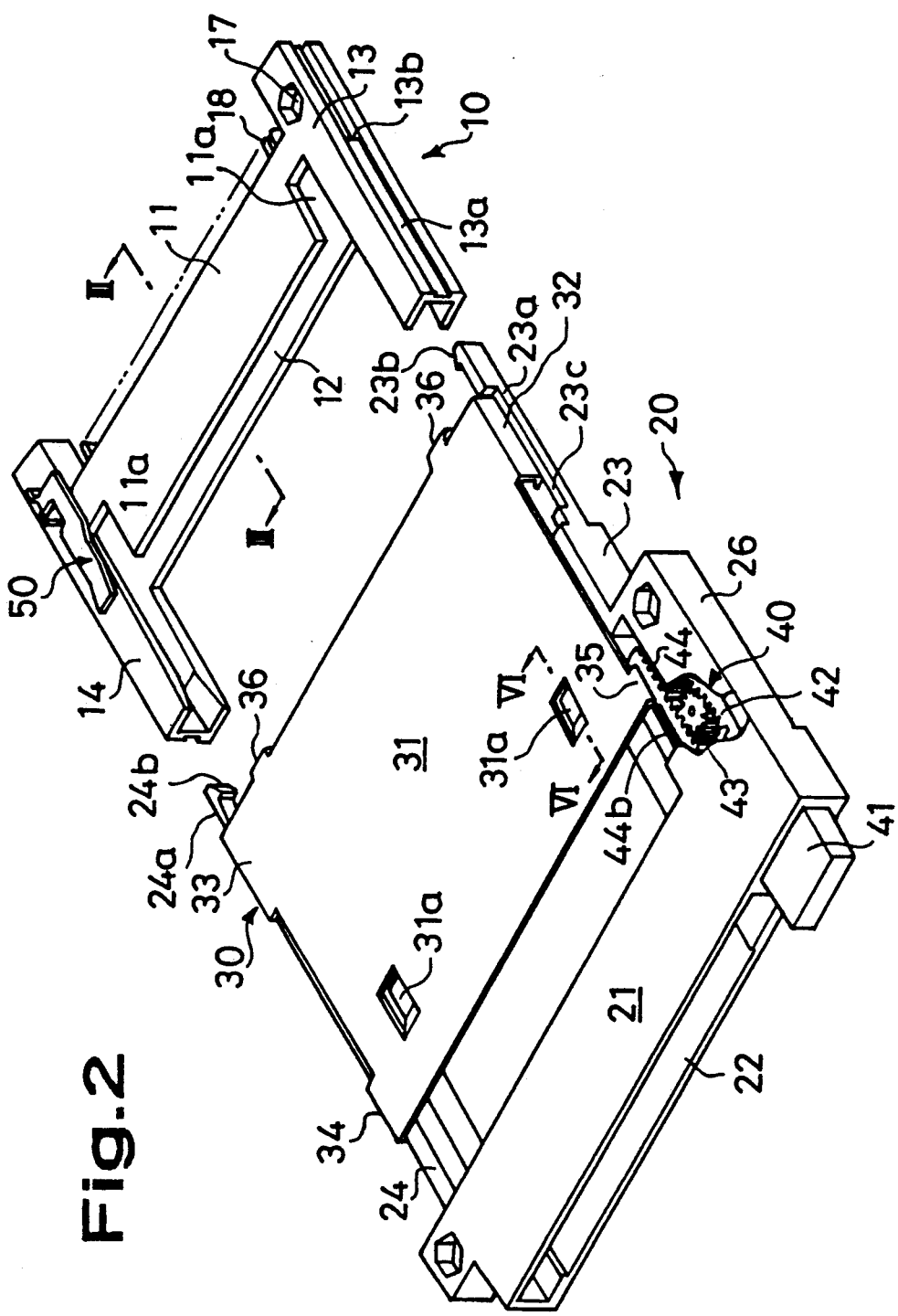
FIG. 2 is a perspective view of the memory card connector in partly exploded condition with the memory card omitted.

As shown particularly in FIGS. 1 and 2, a memory card connector assembly comprises a rearmost retaining frame 10, having a series of contacts 18 anchored therein by insert molding, and a guide frame 20 attached to a front end of the retaining frame 10, for guiding the memory card connector therein, and carrying a metal extraction plate 30.

Figure 3:
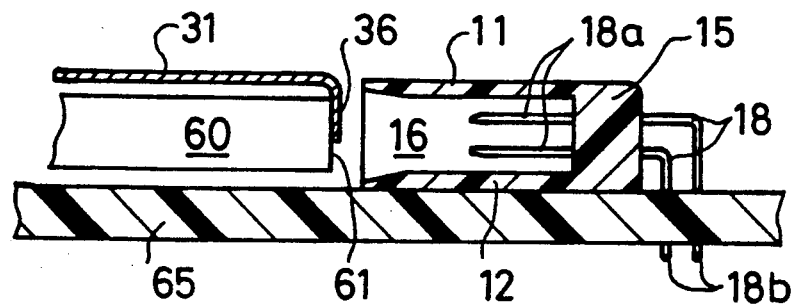
FIG. 3 is a cross-sectional view of a retaining frame member of the memory card connector mounted on a circuit board and taken along a line corresponding to line III—III of FIG. 2.

As shown also in FIG. 3, the retaining frame 10, is molded in one piece from plastic (resin) material, and comprises an upper wall 11, a lower wall 12, left and right side walls 13 and 14, respectively, joining the upper and lower walls, and a back wall 15 defining between them a memory card receiving socket 16, having a forwardly opening card receiving mouth. The contacts 18 are anchored in the back wall 15 and comprise mating pins 18a protruding into the card receiving socket 16 and downwardly bent circuit board connecting portions 18b anchored in respective through holes of a printed circuit base 65 in electrical connection therewith. Guide grooves 13a and 14a terminating rearwardly in rearwardly facing steps or shoulders 13b and 14b, respectively, extend in the insertion direction, along the outer surfaces of forwardly protruding portions of the left and right side walls 13 and 14 of the retaining frame 10, such protruding portions providing opposed memory card receiving channels extending in the insertion direction. A pair of forwardly opening notches 11a are formed in the upper wall 11 of the retaining frame 10 to extend rearwardly from a front edge thereof.

Figure 7:
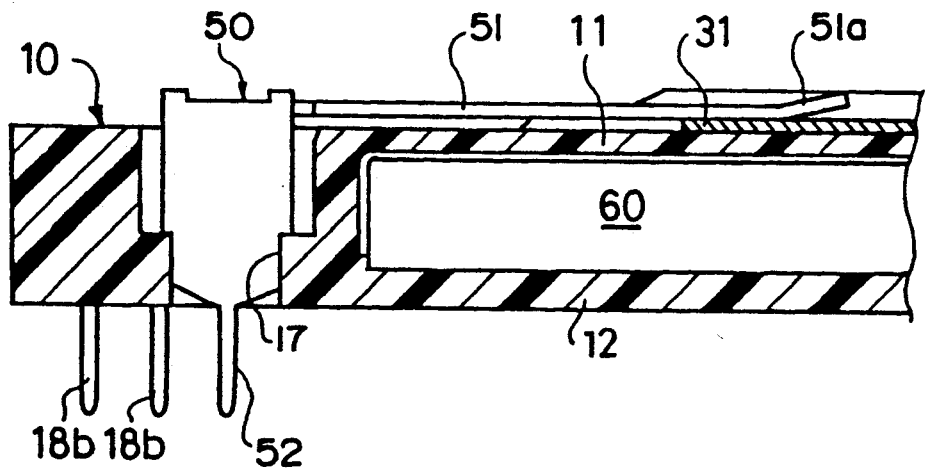
FIG. 7 is a fragmentary cross-sectional view taken along line VII—VII of FIG. 1 and, FIG. 8 is a perspective view of a second embodiment of memory card connector in partly exploded condition with the memory card omitted.

A pair of vertically extending terminal grounding sockets 17 are formed in left and right rear portions of the retaining frame 10. As shown in FIG. 7, a ground terminal 50 is stamped and formed from a single piece of sheet metal stock and comprise a central body portion anchored in the right socket, from respective upper and lower ends of which extend a spring contact finger 51 bent to extend forwardly over the upper surface of the retaining frame and having an upturned leading end and circuit board connecting legs 52 which extend downwardly, connected to ground planes of circuit board 65.

Figure 4:
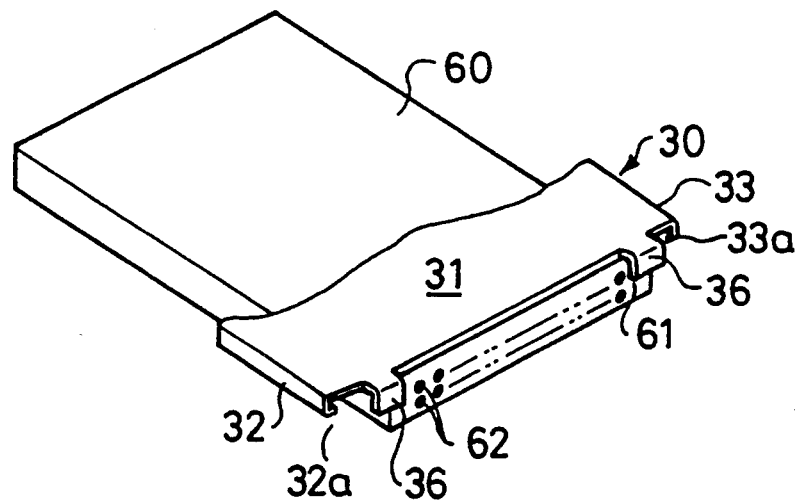
FIG. 4 is a fragmentary perspective view of an extraction plate of the connector showing the positional relationship with a memory card.

As shown particularly in FIG. 4, a memory card 60 has a series of pin receiving sockets 62 formed in a mating, leading end 61 thereof at the same pitch as the mating pins 18a so that insertion of the memory card 60 into the card receiving socket 16 brings the pin receiving sockets 62 into mating engagement with the mating pins 18a, effecting connection therewith.

The guide frame 20 is molded in one piece from plastic (resin) material, and, at a front end, comprises spaced apart upper and lower walls 21 and 22, respectively, joined by left and right side walls 23 and 24, respectively, defining between them a memory card receiving compartment 22 extending in the insertion direction and open to the front and rear mounting arms 23a and 24a extend rearwardly from the left and right side walls 23 and 24, respectively, and have rearmost free ends formed with inwardly extending latching projections 23b and 24b, respectively. Upper surfaces of the mounting arms 23a and 24a, are formed with recesses 23c and 24c, respectively which extend in the insertion direction. A laterally opening mounting groove (not shown) extends in the insertion direction in an outer surface of the left wall 24 of the retaining frame 20.

An ejector attachment portion 26 is integrally formed as one body with the left side wall 23, protruding laterally, in essentially coplanar relation therewith and is formed with a compartment housing an ejector mechanism 40.

The extraction plate 30 has a planar, rectangular, main body 31 formed with a series of guiding arms comprising depending, U-shaped flanges 32-34. Flanges 32 and 33 depend from left and right sides at locations adjacent a rear edge of the main body 30 and flange 34, depends from the right side at a location adjacent the front edge of the main body. A further, linking flange 35 depends from a left side adjacent the front edge.

Downwardly bent, memory card engaging hooks 36 depend from a rear edge of the extraction plate 30 at locations adjacent but spaced from the flanges 32 and 33 for engagement with a rear end surface 61 of a memory card 60 at spaced apart locations clear of the sockets, as shown in FIGS. 3 and 4, and so that, when the memory card is inserted in the guide frame, such hooks being aligned for sliding receipt in the notches 11a in the upper wall of the retaining frame as described below.

Figure 6:
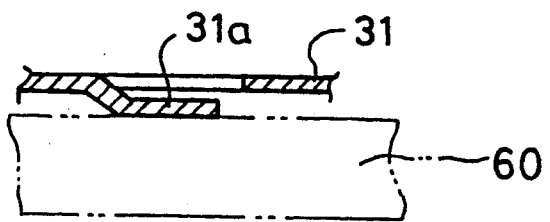
FIG. 6 is a fragmentary cross-sectional view taken along line VI—VI of FIG. 2.

As shown in FIG. 6, card engaging feet 31a are struck out of the main body 31 of the extraction plate 30 at two spaced apart locations to protrude downwardly therefrom, for resiliently engaging the upper surface of a memory card 60 when inserted into the connector, thereby gently clamping the card in the frame.

The ejection mechanism 40, housed in the ejector attachment part 26 of the guide frame 20, consists of four parts: an ejector part 41 which carries driving rack 42 mounted in a compartment 26a formed in the ejector attachment part 26 for free movement in the insertion direction and has an exposed projecting button; pinions 43 rotatively mounted in the compartment, supported by the ejector attachment part 26 and a connecting, driven rack 44 having teeth 44a mounted for reciprocation in the insertion direction within a guide space 26b which extends rearwardly from the compartment 26a.

The driving and driven rack teeth 42a and 44a mesh with teeth on opposite sides of the pinions 43 so that when the button of ejector part 42 is manually depressed in the direction of the arrow A, the pinion 43 is turned in the counterclockwise direction, in FIG. 1, and the connecting part 44 is pulled forwards in the direction of the arrow B. Insertion of a memory card causes movement in a reverse sense.

An upper surface of the connecting part 44A is formed with an elongate, narrow groove 44b which extends in the insertion direction and which receives the flange 35 of the extraction plate 30.

Figure 5:
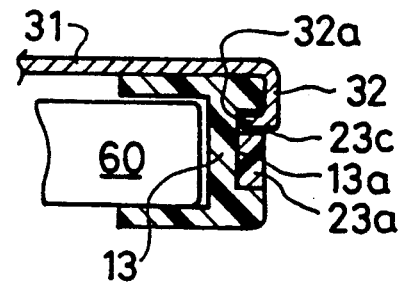
FIG. 5 is a fragmentary cross-sectional view taken along line V—V of FIG. 1.

In attaching the guide frame to the retaining frame, the extraction plate is carried thereon, with the linking flange 35 in the slot 44b, as shown in FIG. 2, and the mounting arms 23a and 24a are inserted along the grooves 13a and 14a, until the latching projections 23b and 24b engage over the steps 13b and 14b in a snap action, as shown in FIG. 1, mounting the memory card receiving compartment securely in alignment with the socket 16. As shown in FIG. 5, mounting grooves, which extend in the insertion direction, are then defined between upper walls of the guide grooves 13a and 14a and lower walls of the recesses 23c and 24c. The free ends 32a and 33a of the guide arms 32 and 33 are received in the mounting grooves and, being shorter, are free to move therealong in the insertion direction while the free end of guide arm 34 is received in a groove extending in the insertion direction in the outer surface of the right wall 24 of the retaining frame 20.

Thus, the extraction plate 30 is attached to the frames 10 and 20 by the three guide arms 32, 33, and 34 enabling free reciprocal movement in the insertion direction. At the same time the hooks 36 are received as sliding fits in the notches 11a.

In use, the memory card 60 is pushed by hand into the memory card receiving compartment so that the rear face is brought into engagement with the hooks 36 thereby carrying the extraction plate rearwardly with the linking flange 35 pushing the rack 44 rearwardly which rotates the pinions counterclockwise and pushes the button of the ejection mechanism outward.

In this condition, the bent parts 31a of the extraction plate 30 resiliently flex against the upper surface of the memory card 60 pressing the memory card 60 downward, holding it in place. As shown in FIG. 7, the hooks 36 are received in the notches 11a of the retaining frame 10 while the left and right side ends of the main body 31 are inserted under the contact fingers 51 of the ground terminals 50, trapped against.

As the main body 31 of the extraction frame 30 overlies the upper surface of the memory card 60 with the feet 31a contacting the upper surface of thereof, any static electricity which has built up in the memory card 60 is grounded to the outside through the extraction plate 30 and the ground terminals 50.

The memory card 60 is extracted from the connector, by depressing the button of the ejector part 41 in the direction of the arrow A so that the driving rack teeth 42a rotate the pinions 43 counterclockwise, pulling the driven part 44 in the direction of the arrow B through the driven rack teeth 44a, the engagement with the flange 35 causing the extraction plate 30 also to be pulled forward, the hooks 36 thereof pulling the memory card 60 the pin receiving sockets 62 from mating engagement with the contact pins. Thereafter, the memory card can be simply extracted by hand.

The planar ejection plate is of sufficient strength and stiffness across the width of the memory card to enable the operating part of the ejection mechanism to be located on only one lateral side and within the plane of the guide frame while the ejector plate is of minimal thickness, affording memory card connector structure of desirably low height. In addition, the memory card connector is of relatively simple construction and adapted for manufacture by conventional mass production techniques.

Figure 8:
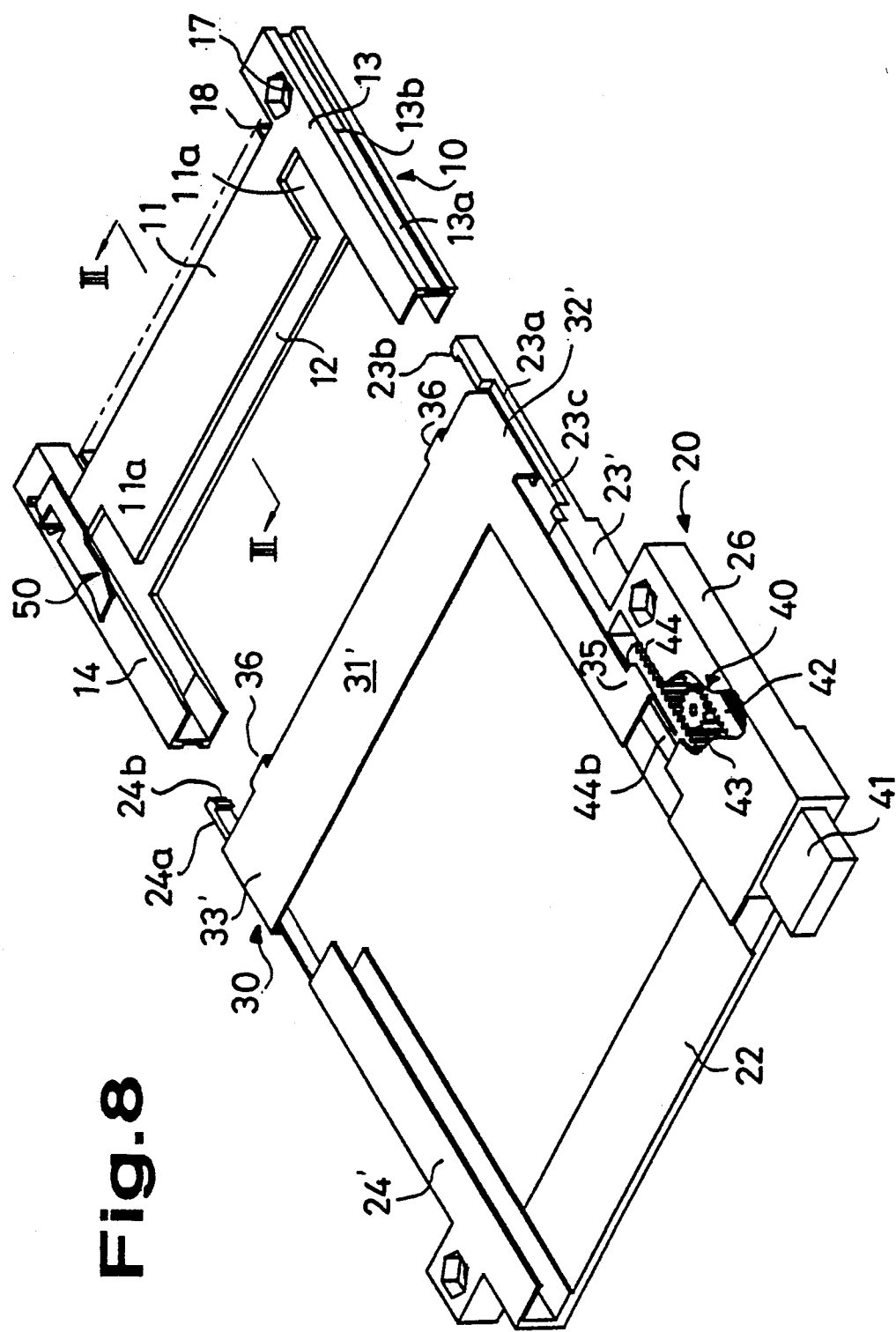

The second embodiment, shown in FIG. 8, is substantially similar to the first and corresponding reference numerals indicate corresponding parts. However the width of the plate form body portion 31' is substantially less, as measured in the insertion direction being of generally L-shape, affording a substantial saving of material and a reduction in weight and requiring only two guide arms 32' and 33'. The opposite side walls 23' and 24' of the guide frame compartment are of channel section, providing opposed, rearwardly extending card receiving guides, while an upper wall is omitted so that the compartment mouth has an open top.

I claim:
1. A memory card connector comprising:
   frame means providing a memory card receiving compartment having a front end formed with an elongate memory card receiving mouth, a rear end with mateable, electrical connecting means extending thereacross, and memory card guiding means extending rearward in a memory card insertion direction away from the mouth towards the electrical connecting means;
   a memory card extraction plate having a thin, substantially planar body portion and memory card engaging hook means extending therefrom, means mounting the extraction plate on the frame for reciprocal movement in the insertion direction with the body portion bridging the compartment and with the hook means extending into the compartment, aligned for engagement with a mating end of a memory card received therein;
   an ejection mechanism located on a lateral side of the guide frame adjacent and in substantially coplanar relation with the mouth comprising an ejection button exposed at the front of the frame, pinion means, and driving and driven rack means operatively connected with the ejection button and the extraction plate, respectively, and meshing with the pinion means in opposite rotational senses whereby
   insertion of the memory card, mating end leading, through the mouth into the compartment brings the mating end, guided by the guide means, into mating engagement with the electrical connecting means to establish electrical connection therewith and depression of the ejection button actuates the driving rack to rotate the pinion means moving the driven rack and thereby the extraction plate forwards with the hook means engaging the mating end of the memory card to pull the memory card forwards out from mating engagement with the electrical connection means permitting manual withdrawal of the memory card from the compartment.

2. A memory card connector according to claim 1 in which the driving and driven racks extend in spaced apart, side-by-side relation in the insertion direction meshed with respective opposite sides of the pinion means.

3. A memory card connector according to claim 2 in which the extraction plate is formed with a flange anchored in the driven rack, thereby operatively connecting the extraction plate to the driven rack.

4. A memory card connector according to claim 3 in which the driven rack is formed with an anchoring slot which extends in the insertion direction, the flange being anchored to the driven rack by receipt in the slot, and the anchoring slot being of greater length than the flange permitting limited sliding movement of the flange therealong in the insertion direction.

5. A memory card connector according to claim 1 in which at least one resilient grounding foot is struck out of the body portion of the extraction plate for grounding engagement with a major face of a memory card received in the compartment, means being provided for connecting the body portion to a ground contact.

6. A memory card connector according to claim 5 in which the means for connecting the body portion to a ground contact comprises a spring contact finger which is mounted to extend forwardly on the rear end of the frame for sliding receipt of the body portion therebetween during insertion and extraction of the memory card from the compartment.

7. A memory card connector according to claim 1 in which the frame means is bipartite, comprising a forward part incorporating the ejection mechanism and a rearward part incorporating the electrical connecting means complementary latching means being provided on respective frame parts interengageable with a snap action to assemble the frame parts together.

8. A memory card connector according to claim 2 in which a lateral side of the guide frame is formed with a compartment housing the ejection mechanism.

9. A memory card connector according to claim 1 comprising means for connecting the body portion to a ground contact comprising a spring contact finger which is mounted to extend forwardly on the rear end of the frame for sliding receipt of the body portion therebetween during insertion and extraction of the memory card from the compartment.

10. A memory card connector comprising:
frame means providing a memory card receiving compartment having a front end formed with an elongate memory card receiving mouth, a rear end with mateable, electrical connecting means extending thereacross, and memory card guiding means extending rearward in a memory card insertion direction away from the mouth towards the electrical connecting means;
a memory card extraction plate having a substantially planar body portion and memory card engaging hook means extending therefrom, means mounting the extraction plate on the frame means for reciprocal movement in the insertion direction with the body portion extending across the compartment and with the hook means extending into the compartment, aligned for engagement with a mating end of a memory card received therein;
an ejection mechanism located on a lateral side of the guide frame adjacent and in substantially coplanar relation with the mouth comprising an ejection button exposed at the front of the frame, pinion means, and driving and driven rack means operatively connected with the ejection button and the extraction plate, respectively, and meshing with the pinion means in opposite rotational senses, the driving and driven racks extending in spaced apart, side-by-side relation in the insertion direction meshed with respective opposite sides of the pinion means, and driven rack being formed with an anchoring slot which extends in the insertion direction and the extraction plate being formed with a flange which is anchored to the driven rack by receipt in the slot, thereby operatively connecting the extraction plate to the driven rack, the anchoring slot being of greater length than the flange permitting limited sliding movement of the flange therealong in the insertion direction, whereby
insertion of the memory card, mating end leading, through the mouth into the compartment brings the mating end, guided by the guide means, into mating engagement with the electrical connecting means to establish electrical connection therewith and depression of the ejection button actuates the driving rack to rotate the pinion means moving the driven rack and thereby the extraction plate forwards with the hook means engaging the mating end of the memory card to pull the memory card forwards out from mating engagement with the electrical connection means permitting manual withdrawal of the memory card from the compartment.

11. A memory card connector comprising:
A memory card connector comprising:
frame means providing a memory card receiving compartment having a front end formed with an elongate memory card receiving mouth, a rear end with mateable, electrical connecting means extending thereacross, and memory card guiding means extending rearward in a memory card insertion direction away from the mouth towards the electrical connecting means;
a memory card extraction plate having a substantially planar body portion and memory card engaging hook means extending therefrom, means mounting the extraction plate on the frame means for reciprocal movement in the insertion direction with the body portion extending across the compartment and with the hook means extending into the compartment, aligned for engagement with a mating end of a memory card received therein, at least one resilient grounding foot being integrally formed with the extraction plate to protrude from the body portion thereof for grounding engagement with a major face of a memory card received in the compartment, and means being provided for connecting the body portion to a ground contact;
an ejection mechanism located on a lateral side of the guide frame adjacent and in substantially coplanar relation with the mouth comprising an ejection button exposed at the front of the frame, pinion means, and driving and driven rack means operatively connected with the ejection button and the extraction plate, respectively, and meshing with the pinion means in opposite rotational senses whereby insertion of the memory card, mating end leading, through the mouth into the compartment brings the mating end, guided by the guide means, into mating engagement with the electrical connecting means to establish electrical connection therewith and depression of the ejection button actuates the driving rack to rotate the pinion means moving the driven rack and thereby the extraction plate forwards with the hook means engaging the mating end of the memory card to pull the memory card forwards out from mating engagement with the electrical connection means permitting manual withdrawal of the memory card from the compartment.

12. A memory card connector according to claim 11 in which the extraction plate is stamped and formed from sheet metal stock and the said at least one resilient grounding foot is struck out from the body portion thereof.

13. A memory card connector according to claim 12 in which the means for connecting the body portion to a ground contact comprises a spring contact finger which is mounted to extend forwardly on the rear end of the frame means for sliding receipt of the body portion therebetween during insertion and extraction of the memory card from the compartment.

14. A memory card connector comprising:
frame means providing a memory card receiving compartment having a front end formed with an elongate memory card receiving mouth, a rear end with mateable, electrical connecting means extending thereacross, and memory card guiding means extending rearward in a memory card insertion direction away from the mouth towards the electrical connecting means;
a memory card extraction plate having a substantially planar body portion and memory card engaging hook means extending therefrom, means mounting the extraction plate on the frame means for reciprocal movement in the insertion direction with the body portion extending across the compartment and with the hook means extending into the compartment, aligned for engagement with a mating end of a memory card received therein, at least one resilient grounding foot being integrally formed with the extraction plate to protrude from the body portion thereof for grounding engagement with a major face of a memory card received in the compartment, and means being provided for connecting the body portion to a ground contact;
an ejection mechanism located on a lateral side of the guide frame whereby
insertion of the memory card, mating end leading, through the mouth into the compartment brings the mating end, guided by the guide means, into mating engagement with the electrical connecting means to establish electrical connection therewith and operation of the ejection means moves the extraction plate forwards with the hook means engaging the mating end of the memory card to pull the memory card forwards out from mating engagement with the electrical connection means, permitting manual withdrawal of the memory card from the compartment.

15. A memory card connector according to claim 1 in which the compartment mouth is of channel section, being open to a top, and the substantially planar body portion of the memory card extraction plate is L-shape, a base of the L-shape bridging over the compartment at a location remote from the mouth and the hook means extending from the base.

16. A memory card connector according to claim 1 in which the extraction plate is stamped and formed from sheet metal stock.

* * * * *